US012562143B2

(12) United States Patent
Deshmukh et al.

(10) Patent No.: US 12,562,143 B2
(45) Date of Patent: Feb. 24, 2026

(54) UNIT CELL AND STRUCTURAL PANEL ASSEMBLIES WITH ENHANCED IMPACT AND NOISE ABSORPTION CHARACTERISTICS

(71) Applicant: Volvo Car Corporation, Gothenburg (SE)

(72) Inventors: Kaustubh Deshmukh, Gothenburg (SE); Aleksandra Sadowska, Gothenburg (SE); Dag Aronson, Gothenburg (SE); Jan Nilsson, Gothenburg (SE); Sladjana Strbac, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 406 days.

(21) Appl. No.: 18/222,523

(22) Filed: Jul. 17, 2023

(65) Prior Publication Data
US 2025/0029588 A1     Jan. 23, 2025

(51) Int. Cl.
| | |
|---|---|
| *G10K 11/172* | (2006.01) |
| *B60R 13/08* | (2006.01) |
| *G10K 11/162* | (2006.01) |

(52) U.S. Cl.
CPC ........ *G10K 11/172* (2013.01); *B60R 13/0815* (2013.01); *G10K 11/162* (2013.01)

(58) Field of Classification Search
CPC . G10K 11/172; G10K 11/162; B60R 13/0815
See application file for complete search history.

(56) References Cited

U.S. PATENT DOCUMENTS

| | | | |
|---|---|---|---|
| 7,070,030 B2 | 7/2006 | Etcheverry | |
| 8,474,574 B1 | 7/2013 | Kobayashi et al. | |
| | (Continued) | | |

FOREIGN PATENT DOCUMENTS

| | | |
|---|---|---|
| CN | 204452315 U | 7/2015 |
| CN | 104837098 A1 | 8/2015 |
| | (Continued) | |

OTHER PUBLICATIONS

Nov. 11, 2024 European Search Report issued in corresponding EP Application No. 24188555.
(Continued)

*Primary Examiner* — Forrest M Phillips
(74) *Attorney, Agent, or Firm* — Clements Bernard Walker; Christopher L. Bernard

(57)     ABSTRACT
A structural panel assembly including an array of unit cell assemblies. Each unit cell assembly includes: an outer frame member spaced apart from an inner frame member; a plurality of quasi-zero stiffness (QZS) spring members disposed between the inner frame member and the outer frame member; a phononic crystal disposed between the inner frame member and the outer frame member; and a plurality of locally-resonating phononic crystals (LRPC) spring members disposed between the phononic crystal and one or more of the inner frame member and the outer frame member. The phononic crystal acts as a scattering phononic crystal (SPC) for attenuating high-frequency sound waves within the unit cell assembly and as a vibrating mass for the LRPC spring members for attenuating low-frequency sound waves within the unit cell assembly by converting the low-frequency sound waves to heat by vibration.

20 Claims, 5 Drawing Sheets

(56) References Cited

U.S. PATENT DOCUMENTS

| | | | |
|---|---|---|---|
| 9,087,505 | B2 | 7/2015 | Inoue et al. |
| 9,462,847 | B2 | 10/2016 | Twardowski et al. |
| 10,030,342 | B2 | 7/2018 | Nomura et al. |
| 10,077,085 | B2 | 9/2018 | Pfaffelhuber |
| 10,082,189 | B2 | 9/2018 | Kronkright et al. |
| 10,086,784 | B2 | 10/2018 | Duffe |
| 10,220,736 | B2 * | 3/2019 | Cormier .................. B60N 2/24 |
| 10,540,952 | B2 | 1/2020 | Mohammadi Gojani et al. |
| 10,704,255 | B2 | 7/2020 | Hakuta et al. |
| 10,967,802 | B2 | 4/2021 | Sabdad |
| 11,306,796 | B2 | 4/2022 | Hiramatsu |
| 11,420,565 | B2 | 8/2022 | Ritter et al. |
| 11,498,282 | B1 | 11/2022 | Walsh et al. |
| 2016/0032997 | A1 | 2/2016 | Seepersad et al. |
| 2017/0051806 | A1 | 2/2017 | Kang et al. |
| 2017/0105461 | A1 | 4/2017 | Hancock et al. |
| 2019/0145740 | A1 | 5/2019 | Czerski et al. |
| 2020/0290517 | A1 | 9/2020 | Sabdad |
| 2021/0009241 | A1 | 1/2021 | Gates et al. |
| 2021/0251327 | A1 * | 8/2021 | Stone ..................... A42B 3/065 |
| 2022/0205508 | A1 * | 6/2022 | Wu ....................... G10K 11/172 |
| 2022/0290570 | A1 * | 9/2022 | Jenett ........................ B22F 5/04 |
| 2022/0371519 | A1 | 11/2022 | Weber |
| 2022/0403652 | A1 | 12/2022 | Taira et al. |
| 2023/0060547 | A1 | 3/2023 | Mellergard et al. |
| 2024/0392563 | A1 * | 11/2024 | Alavi ...................... C04B 28/04 |
| 2024/0401667 | A1 * | 12/2024 | Wang ..................... E02D 31/08 |

FOREIGN PATENT DOCUMENTS

| | | | |
|---|---|---|---|
| CN | 105040603 | A | 11/2015 |
| CN | 106328115 | A | 1/2017 |
| CN | 106402262 | B | 2/2017 |
| CN | 107667037 | A | 2/2018 |
| CN | 105972147 | B | 3/2018 |
| CN | 108312992 | A | 7/2018 |
| CN | 108361314 | A | 8/2018 |
| CN | 108463377 | A | 8/2018 |
| CN | 108502031 | A | 9/2018 |
| CN | 108610486 | A | 10/2018 |
| CN | 108895108 | A | 11/2018 |
| CN | 110277083 | A | 9/2019 |
| CN | 110439947 | A | 11/2019 |
| CN | 209719505 | U | 12/2019 |
| CN | 209987881 | U | 1/2020 |
| CN | 110843709 | A | 2/2020 |
| CN | 210067888 | U | 2/2020 |
| CN | 210859654 | U | 6/2020 |
| CN | 112242131 | A | 1/2021 |
| CN | 112527027 | A | 3/2021 |
| CN | 112537263 | A | 3/2021 |
| CN | 110502787 | B | 4/2021 |
| CN | 112758519 | A | 5/2021 |
| CN | 213508112 | U | 6/2021 |
| CN | 113339438 | A | 9/2021 |
| CN | 110332270 | B | 10/2021 |
| CN | 216040774 | U | 3/2022 |
| CN | 216040776 | U | 3/2022 |
| CN | 216119540 | U | 3/2022 |
| CN | 115303150 | A | 11/2022 |
| CN | 115758903 | A | 3/2023 |
| EP | 3303871 | B1 | 8/1984 |
| EP | 2595142 | A1 | 5/2013 |
| EP | 3253243 | B1 | 12/2017 |
| EP | 3500427 | B1 | 2/2021 |
| EP | 3264412 | B1 | 9/2021 |
| EP | 4120243 | A1 | 1/2023 |
| IN | 201617023637 | B | 8/2016 |
| JP | 5194972 | B2 | 5/2013 |
| JP | 5827980 | B2 | 12/2015 |
| JP | 6276861 | B2 | 2/2018 |
| JP | 2018031930 | A | 3/2018 |
| JP | 2018066914 | A | 4/2018 |
| JP | 6867308 | B2 | 4/2021 |
| JP | 6918010 | B2 | 8/2021 |
| JP | 6942729 | B2 | 9/2021 |
| KR | 10245259 | B1 | 4/2004 |
| RU | 2557865 | C1 | 7/2015 |
| WO | 2005089176 | A2 | 9/2005 |
| WO | 2015011298 | A1 | 1/2015 |
| WO | 2015117868 | A1 | 8/2015 |
| WO | 2016193935 | A1 | 12/2016 |
| WO | 2017009646 | A1 | 1/2017 |
| WO | 2017120378 | A1 | 7/2017 |
| WO | 2018047153 | A1 | 3/2018 |
| WO | 2018077698 | A1 | 5/2018 |
| WO | 2018189719 | A1 | 10/2018 |
| WO | 2021209500 | A1 | 10/2021 |
| WO | 2022078455 | A1 | 4/2022 |
| WO | 2022157628 | A1 | 7/2022 |

OTHER PUBLICATIONS

JL J C et al. "Vibration control based metamaterials and origami structures: A state-of-the-art review", Mechanical Systems and Signal Processing, School of Mechanical and Mechatronic Engineering, University of Technology Sydney, NSW 2007, Australia pp. 1-38.

Liu et al. "A Review of Acoustic Metamaterials and Phononic Crystals", Received: Mar. 20, 2020; Accepted: Apr. 10, 2020; Published: Apr. 15, 2020, www.mdpi.com/journal/crystals, pp. 1-26.

* cited by examiner

*40*

```
┌─────────────────────────────────────────┐
│   Provide the outer frame member spaced  │
│    apart from the inner frame member     │
│              (step 42)                   │
└─────────────────────────────────────────┘
                    │
                    ▼
┌─────────────────────────────────────────┐
│  Provide the plurality of QZS spring     │
│  members disposed between the inner      │
│  frame member and the outer frame member │
│              (step 44)                   │
└─────────────────────────────────────────┘
                    │
                    ▼
┌─────────────────────────────────────────┐
│ Provide the phononic crystal disposed    │
│ between the inner frame member and the   │
│          outer frame member              │
│              (step 46)                   │
└─────────────────────────────────────────┘
                    │
                    ▼
┌─────────────────────────────────────────┐
│  Provide the plurality of LRPC spring    │
│  members disposed between the phononic   │
│  crystal and one or more of the inner    │
│  frame member and the outer frame member │
│              (step 48)                   │
└─────────────────────────────────────────┘
```

Disposed the unit cell assembly one or more of
horizontally and vertically adjacent to a plurality of
other unit cell assemblies to form an array of unit cell
assemblies forming the structural panel assembly
(step 52)

Disposed the structural panel assembly between
the inner panel and the outer panel of the
vehicle or other structure
(step 54)

UNIT CELL AND STRUCTURAL PANEL ASSEMBLIES WITH ENHANCED IMPACT AND NOISE ABSORPTION CHARACTERISTICS

TECHNICAL FIELD

The present disclosure relates generally to unit cell and structural panel assemblies with enhanced impact, noise absorption, and insulation characteristics for use in automotive, aerospace, construction, and other applications. The unit cell and structural panel assemblies combine quasi-zero stiffness (QZS) structures, scattering phononic crystals (SPCs), and locally-resonating phononic crystals (LRPCs) enabled by additive manufacturing, molding, and other techniques.

BACKGROUND

In designing automotive, aerospace, construction, and other structures, impact sustainability and noise attenuation are significant considerations. Conventional structures often struggle to withstand high-intensity impacts or sudden loads without sustaining significant damage. This can lead to safety hazards, structural failures, and increased maintenance costs. To avoid this, such structures typically need to be made unnecessarily heavy and bulky, which is inefficient. Further, noise pollution is a pervasive problem in various industries and everyday environments. Excessive noise can have detrimental effects on human health, productivity, and quality of life. Traditional noise reduction methods, such as sound barriers and insulation materials, may have limitations in effectively attenuating specific frequency ranges.

The need for structures to sustain impacts without significant damage has been a long-standing concern, particularly in industries such as automotive, aerospace, and construction. Thus, rigid structures have commonly been used, which has often resulted in high levels of damage upon impact. Over time, researchers and engineers have explored the use of materials with improved impact resistance, such as high-strength alloys, composites, and energy-absorbing foams. These materials have offered some improvements, but have not always been sufficient to prevent damage or ensure the safety of a structure. Recently, the concept of QZS structures has emerged as a promising approach to effectively absorb and dissipate impact energy.

Likewise, conventional approaches to noise mitigation include the use of sound barriers, acoustic insulation materials, and passive damping systems. While these methods can provide some level of noise reduction, they often have limitations in effectively attenuating specific frequency ranges or selectively targeting specific noise sources. Additionally, the methods may add weight, complexity, and cost to a system. Recently, automotive manufacturers have experimented with using either SPCs or LRPCs, but not both.

This background is provided as illustrative environmental context only and should not be construed to be limiting in any manner. It will be readily apparent to those of ordinary skill in the art that the principles and concepts of the present disclosure may be implemented in other environmental contexts equally, without limitation.

BRIEF SUMMARY

The present disclosure relates generally to unit cell and structural panel assemblies with enhanced impact, noise absorption, and insulation characteristics for use in automotive, aerospace, construction, and other applications. The unit cell and structural panel assemblies combine QZS structures, SPCs, and LRPCs enabled by additive manufacturing, molding, and other techniques. This offers an improved approach to enhancing impact sustainability and noise attenuation in various applications.

In one illustrative embodiment, the present disclosure provides a unit cell assembly, including: an outer frame member spaced apart from an inner frame member; a plurality of QZS spring members disposed between the inner frame member and the outer frame member; a phononic crystal disposed between the inner frame member and the outer frame member; and a plurality of LRPC spring members disposed between the phononic crystal and one or more of the inner frame member and the outer frame member. The outer frame member is an open frame member allowing for the penetration of sound waves into the unit cell assembly through the outer frame member. The inner frame member is a closed frame member including a barrier material attenuating the transmission of sound waves out of the unit cell assembly through the inner frame member. The phononic crystal is a disc that acts as a SPC for attenuating high-frequency sound waves within the unit cell assembly. The phononic crystal is a disc that acts as a vibrating mass for the LRPC spring members for attenuating low-frequency sound waves within the unit cell assembly by converting the low-frequency sound waves to heat by vibration. Optionally, the plurality of QZS spring members are disposed at vertices of the inner frame member and the outer frame member. Optionally, the plurality of LRPC spring members are disposed between the plurality of QZS spring members. The plurality of LRPC spring members are disposed between the phononic crystal and the outer frame member. The plurality of LRPC spring members are each disposed at an oblique angle between the phononic crystal and the one or more of the inner frame member and the outer frame member. The unit cell assembly is formed by one or more of an additive manufacturing technique and a molding technique.

In another illustrative embodiment, the present disclosure provides a structural panel assembly including an array of unit cell assemblies. Each unit cell assembly includes: an outer frame member spaced apart from an inner frame member; a plurality of QZS spring members disposed between the inner frame member and the outer frame member; a phononic crystal disposed between the inner frame member and the outer frame member; and a plurality of LRPC spring members disposed between the phononic crystal and one or more of the inner frame member and the outer frame member. The outer frame member is an open frame member allowing for the penetration of sound waves into the unit cell assembly through the outer frame member. The inner frame member is a closed frame member including a barrier material attenuating the transmission of sound waves out of the unit cell assembly through the inner frame member. The phononic crystal is a disc that acts as a SPC for attenuating high-frequency sound waves within the unit cell assembly. The phononic crystal is a disc that acts as a vibrating mass for the LRPC spring members for attenuating low-frequency sound waves within the unit cell assembly by converting the low-frequency sound waves to heat by vibration. The plurality of LRPC spring members are each disposed at an oblique angle between the phononic crystal and the one or more of the inner frame member and the outer frame member. The array of unit cell assemblies is one or both of an array of horizontally disposed unit cell assemblies and an array of vertically disposed unit cell assemblies, and the array of unit cell assemblies is formed by one or more of an additive manufacturing technique and a molding technique. The array of unit cell assemblies is disposed between an inner panel and an outer panel of a vehicle structure.

In a further illustrative embodiment, the present disclosure provides a method for forming a unit cell assembly, the method including the steps of: providing an outer frame member spaced apart from an inner frame member; providing a plurality of QZS spring members disposed between the inner frame member and the outer frame member; providing a phononic crystal disposed between the inner frame member and the outer frame member; and providing a plurality of LRPC spring members disposed between the phononic crystal and one or more of the inner frame member and the outer frame member; the providing steps include using one or more of an additive manufacturing technique and a molding technique. The outer frame member is an open frame member allowing for the penetration of sound waves into the unit cell assembly through the outer frame member, and the inner frame member is a closed frame member including a barrier material attenuating the transmission of sound waves out of the unit cell assembly through the inner frame member. The phononic crystal is a disc that acts as a SPC for attenuating high-frequency sound waves within the unit cell assembly and as a vibrating mass for the LRPC spring members for attenuating low-frequency sound waves within the unit cell assembly by converting the low-frequency sound waves to heat by vibration. The method also includes disposing the unit cell assembly one or more of horizontally and vertically adjacent to a plurality of other unit cell assemblies to form an array of unit cell assemblies forming a structural panel assembly.

It will be readily apparent to those of ordinary skill in the art that elements of any illustrative embodiment provided herein may be used with any other illustrative embodiment, without limitation.

BRIEF DESCRIPTION OF THE DRAWINGS

The present disclosure is illustrated and described herein with reference to the various drawings, in which like reference numbers are used to denote like assembly components/method steps, as appropriate, and in which:

FIG. 4 is a flowchart of one illustrative embodiment of the method for forming the unit cell of the present disclosure.

Figure 1:
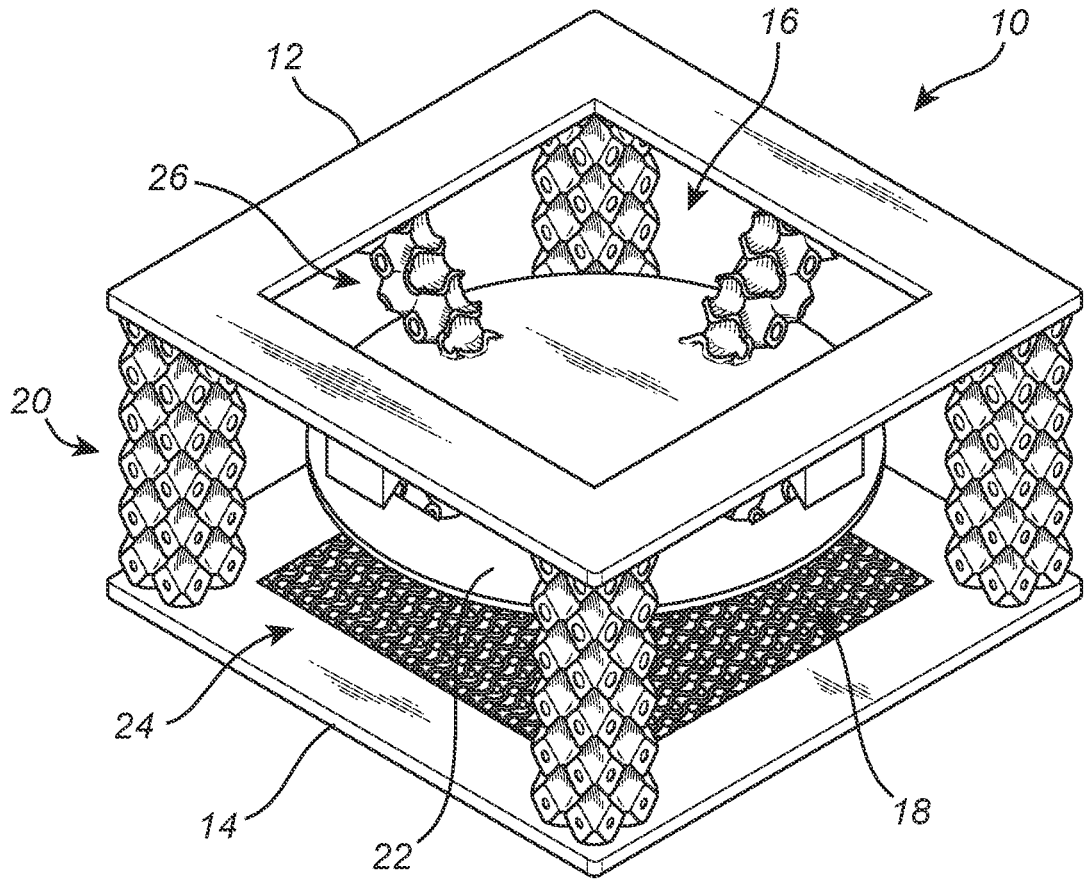
FIG. 1 is a perspective view of one illustrative embodiment of the unit cell of the present disclosure.

Again, it will be readily apparent to those of ordinary skill in the art that elements of any illustrative embodiment provided herein may be used with any other illustrative embodiment, without limitation.

DETAILED DESCRIPTION

Again, the present disclosure relates generally to unit cell and structural panel assemblies with enhanced impact, noise absorption, and insulation characteristics for use in automotive, aerospace, construction, and other applications. The unit cell and structural panel assemblies combine QZS structures, SPCs, and LRPCs enabled by additive manufacturing, molding, and other techniques. This offers an improved approach to enhancing impact sustainability and noise attenuation in various applications.

Phononic crystals have garnered significant attention in the automotive sector for their ability to manipulate and control the propagation of sound waves. Phononic crystals are periodic structures that exhibit spatial variation in mechanical properties, enabling them to selectively filter, attenuate, and/or guide sound waves. By exploiting the bandgap properties of phononic crystals, specific frequency ranges associated with noise can be effectively attenuated or blocked. The proposed design utilizes a combination SPCs, which are effective to attenuate high-frequency noise, and LRPCs, which are known for their effectiveness at converting low-frequency noise energy into heat by vibration. The frequency at which all mode shapes occur can be programmed by changing the spring stiffness and mass of the vibrator.

QZS structures are engineered systems designed to exhibit extremely low stiffness under normal conditions, while maintaining high stiffness when subjected to large deformation or impact forces. This unique characteristic allows them to effectively absorb and dissipate energy during an impact, thereby mitigating the effects of sudden loads and shocks.

As QZS structures, SPCs, and LRPCs are generally known to those of ordinary skill in the art, they are not described in great detail herein. Rather, the present disclosure focuses on specific uses of such materials.

As described in greater detail herein below, the design of the present disclosure houses a phononic crystal disc or the like, which acts as a scatterer for SPC functionality and a vibrating mass for LRPC functionality. The phononic crystal is connected to an outer frame using LRPC springs, which have different spring stiffness that may be tuned. The stiffness of the LRPC springs may be altered to change the resonance mode shape to target specific frequencies. The vibrator mass may be altered for the same purpose by changing the infill density, for example. The outer frame and inner frame of the design are separated and kept in place by load springs having the same stiffness, which act as QZS structures during an impact.

This design also uses the inherent shape memory behavior of common polymeric materials, like polyactic acid (PLA) and thermoplastic polyurethane (TPU), in order to regain an original shape post impact with heat as the stimuli. Using such materials, along with meta-structures/architected materials, provides a lightweight and compact solution as compared to conventional methods. The potential applications for this innovation are diverse, ranging from the automotive and aerospace industries, where impact resistance and noise control are crucial, to the construction industry.

Thus, the proposed solution integrates the QZS structures, SPC, and LRPCs into a single unit cell that can be programmed for each application given the loads and frequency isolation data. It offers the advantage of enhanced impact sustainability. Unlike conventional approaches, that primarily rely on the strength and stiffness of the materials used, QZS structures exhibit extremely low stiffness under normal conditions and efficiently absorb and dissipate impact energy, minimizing transmitted forces and reducing the risk of structural damage. The proposed solution also offers the advantage of targeted noise attenuation. The integration of phononic crystals within the unit cell enables precise control and manipulation of sound waves. Unlike conventional noise reduction methods that often provide general noise attenuation, the phononic crystals selectively attenuate or block specific frequency ranges associated with noise. The proposed solution further offers the advantage of versatility and integration. The unit cell offers versatility in its applications and integration into existing structures. It can be seamlessly incorporated into various components, such as vehicle frames and body panels, door panels, machinery mounts, etc.

The proposed design consists of an inner frame and an outer frame connected to each other by QZS load springs and the size/lattice constant of such unit cell can be calculated from the Bragg frequency using the generic equation:

$$f_c = c/2a$$

The design has inclined/oblique LRPC springs that connect the scatterer/vibrator to the outer frame. The mode shape of the vibrator can be simulated using finite element analysis (FEM) and tuned accordingly. The design uses materials like PLA and TPU, which are readily available and exhibit a lesser-known shape memory behavior when exposed to heat. The unit cells are used to form an array that may fill a defined space, e.g., the space between inner and outer door panels of a vehicle, etc.

Referring now specifically to FIG. 1, in one illustrative embodiment, the unit cell assembly 10 includes an outer frame member 12 spaced apart from an inner frame member 14. In this embodiment, each of the outer frame member 12 and the inner frame member 14 is a substantially rectangular or square frame member with a length of about 95 mm, a width of about 95 mm, and a thickness of about 2.5 mm, although other shapes and dimensions may be used equally. The outer frame 12 is spaced apart from the inner frame by a distance of about 35 mm. The outer frame member 12 is an open frame member defining an opening 16 and allowing for the penetration of sound waves into the unit cell assembly 10 through the outer frame member 12. The inner frame member 14 is a closed frame member including a barrier material 18, such as PLA, TPU, or the like, in an interior thereof for attenuating the transmission of sound waves out of the unit cell assembly 10 through the inner frame member 14. Each of the outer frame member 12 and the inner frame member may be made of PLA, TPU, or the like.

A plurality of QZS spring members 20 are disposed between the inner frame 14 and the outer frame member 12. Each of the QZS spring members 20 is made of PLA, TPU, or the like and includes a thin-walled Schwarz triply periodic minimal surface (TPMS) lattice structure. As illustrated, optionally, the plurality of QZS spring members 20 are disposed at vertices of the inner frame member 14 and the outer frame member 12, and have a length of about 35 mm. The QZS spring members 20 are a cuboid-shaped volume of dimensions x, y, and z (10 mm, 10 mm, and 35 mm, for example, depending on the application) that is filled with a Schwarz TPMS lattice structure with a lattice constant of a, b, and c and a wall thickness of t. It is important to note that the dimensions may change according to the application.

A phononic crystal 22 is disposed between the inner frame member 14 and the outer frame member 12. The phononic crystal 22 is made of PLA or the like and, in this embodiment, has a disc shape with a diameter of about 76 mm and a thickness of about 12 mm at the axis and about 2 mm at the circumference, although other shapes and dimensions may be used equally. The phononic crystal 22 is suspended within the cavity 24 formed by the inner frame 14, the outer frame 12, and the plurality of QZS spring members 20. The phononic crystal 22 acts as a SPC for tunably attenuating high-frequency sound waves, between about 1700 Hz and about 1900 Hz, within the unit cell assembly 10. The phononic crystal 22 also acts as a vibrating mass for the LRPC spring members 26 for attenuating low-frequency sound waves, between about 200 Hz and about 700 Hz and harmonics, within the unit cell assembly 10 by converting the low-frequency sound waves to heat by vibration.

The plurality of LRPC spring members 26 are disposed between the phononic crystal 22 and one or more of the inner frame member 14 and the outer frame member 12. In this embodiment, optionally, the plurality of LRPC spring members 26 are disposed between the plurality of QZS spring members 20 and are disposed between the phononic crystal 22 and the outer frame member 12. The plurality of LRPC spring members 26 are each disposed at an oblique angle of about 62 degrees, depending on the frame structure, between the phononic crystal 22 and the outer frame member 12. Each of the LRPC spring members 26 is made of TPU or the like, includes a thin-walled Schwarz TPMS lattice structure, and has a length of about 25 mm. The LRPC spring members 26 are a cuboid-shaped volume of dimensions x, y, and z that is filled with a Schwarz TPMS lattice structure with a lattice constant of a, b, and c and a wall thickness of t. It is important to note that the dimensions may change according to the application.

The unit cell assembly 10 is formed by one or more of an additive manufacturing technique and a molding technique.

Figure 2:
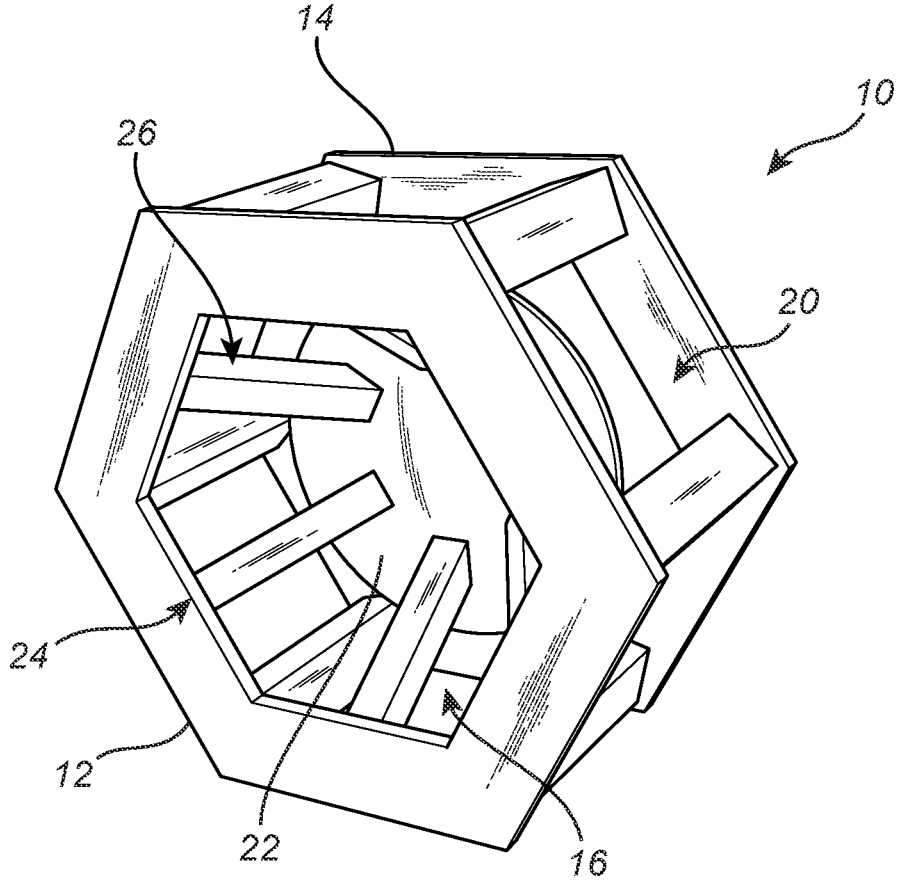
FIG. 2 is a perspective view of another illustrative embodiment of the unit cell of the present disclosure.

Referring now specifically to FIG. 2, in another illustrative embodiment, the unit cell assembly 10 again includes an outer frame member 12 spaced apart from an inner frame member 14. In this embodiment, each of the outer frame member 12 and the inner frame member 14 is a substantially hexagonal frame member with a side length of about 55 mm, depending on the lattice constant, and a thickness of about 2.5 mm, although other shapes and dimensions may be used equally. The outer frame 12 is spaced apart from the inner frame by a distance of about 35 mm. The outer frame member 12 is an open frame member defining an opening 16 and allowing for the penetration of sound waves into the unit cell assembly 10 through the outer frame member 12. The inner frame member 14 is also an open frame member defining an opening 16 and allowing for the transmission of sound waves out of the unit cell assembly 10 through the inner frame member 14. Each of the outer frame member 12 and the inner frame member may be made of PLA, TPU, or the like.

A plurality of QZS spring members 20 are disposed between the inner frame 14 member and the outer frame member 12. Each of the QZS spring members 20 is made of PLA, TPU, or the like and includes a thin-walled Schwarz triply periodic minimal surface (TPMS) lattice structure. As illustrated, optionally, the plurality of QZS spring members 20 are disposed at vertices of the inner frame member 14 and the outer frame member 12, and have a length of about 35 mm. The QZS spring members 20 are a cuboid-shaped volume of dimensions x, y, and z (10 mm, 10 mm, and 35 mm, for example, depending on the application) that is filled with a Schwarz TPMS lattice structure with a lattice constant of a, b, and c and a wall thickness of t. It is important to note that the dimensions may change according to the application.

A phononic crystal 22 is disposed between the inner frame member 14 and the outer frame member 12. The phononic crystal 22 is made of PLA or the like and, in this embodiment, has a disc shape with a diameter of about 76 mm and a thickness of about 12 mm at the axis and about 2 mm at the circumference, although other shapes and dimensions may be used equally. The phononic crystal 22 is suspended within the cavity 24 formed by the inner frame 14, the outer frame 12, and the plurality of QZS spring members 20. The phononic crystal 22 acts as a SPC for tunably attenuating high-frequency sound waves, between about 1700 Hz and about 1900 Hz, within the unit cell assembly 10. The phononic crystal 22 also acts as a vibrating mass for the LRPC spring members 26 for attenuating low-frequency sound waves, between about 200 Hz and about 700 Hz and harmonics, within the unit cell assembly 10 by converting the low-frequency sound waves to heat by vibration.

The plurality of LRPC spring members 26 are disposed between the phononic crystal 22 and one or more of the inner frame member 14 and the outer frame member 12. In this embodiment, optionally, the plurality of LRPC spring members 26 are disposed between the plurality of QZS spring members 20 and are disposed between the phononic crystal 22 and the outer frame member 12. The plurality of LRPC spring members 26 are each disposed at an oblique angle of about 62 degrees, depending on the frame structure, between the phononic crystal 22 and the outer frame member 12. Each of the LRPC spring members 26 is made of TPU or the like, includes a thin-walled Schwarz TPMS lattice structure, and has a length of about 25 mm. The LRPC spring members 26 are a cuboid-shaped volume of dimensions x, y, and z that is filled with a Schwarz TPMS lattice structure with a lattice constant of a, b, and c and a wall thickness of t. It is important to note that the dimensions may change according to the application.

Again, the unit cell assembly 10 is formed by one or more of an additive manufacturing technique and a molding technique.

Figure 3:
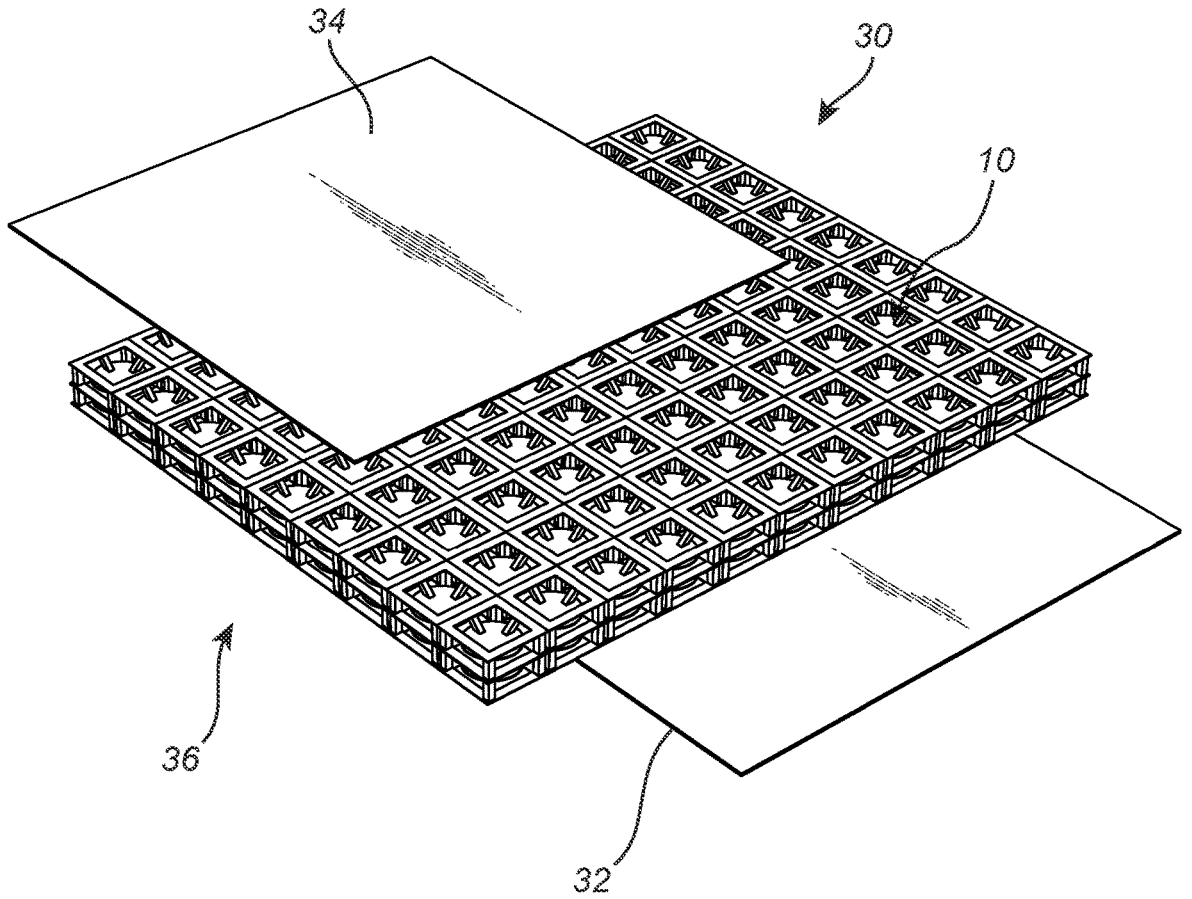
FIG. 3 is a perspective view of one illustrative embodiment of the structural panel of the present disclosure.

Referring now specifically to FIG. 3, in one illustrative embodiment, the structural panel assembly 30 includes a plurality of unit cell assemblies 10 formed or joined together to form a unitary structural member that is incorporated into a vehicle, structure, or the like to provide enhanced impact sustainability, noise absorption, and insulation for the vehicle, structure, or the like. The structural panel assembly 30, consisting of an array of unit cell assemblies 10, may be one or both of an array of horizontally disposed unit cell assemblies 10 and an array of vertically disposed unit cell assemblies 10 having any suitable length, width, and depth shapes and/or dimensions for a given application. For example, the structural panel assembly 30 may be disposed between an inner panel 32 and an outer panel 34 of a vehicle structure 36, such as a vehicle door. Impact sustainability is promoted, and noise from the exterior of the vehicle door may be come entrapped within and dissipated by the structural panel assembly 30, isolating the cabin of the vehicle from the noise. A multitude of other uses are also possible. In this example, the structural panel 30 may be adhered to one or more of the inner panel 32 and the outer panel 34, and/or may utilize other intervening structures, layers, and/or materials.

FIG. 4 is a flowchart of one illustrative embodiment of the method 40 for forming the unit cell assembly 10 of the present disclosure. The method includes the steps of: providing the outer frame member spaced apart from the inner frame member (step 42), providing the plurality of QZS spring members disposed between the inner frame member and the outer frame member (step 44), providing the phononic crystal disposed between the inner frame member and the outer frame member (step 46), and providing the plurality of LRPC spring members disposed between the phononic crystal and one or more of the inner frame member and the outer frame member (step 48). The steps are performed using one or more of an additive manufacturing technique and a molding technique, for example. Again, the outer frame member is an open frame member allowing for the penetration of sound waves into the unit cell assembly through the outer frame member, and the inner frame member is a closed frame member comprising a barrier material attenuating the transmission of sound waves out of the unit cell assembly through the inner frame member. The phononic crystal is a disc that acts as a SPC for attenuating high-frequency sound waves within the unit cell assembly and as a vibrating mass for the LRPC spring members for attenuating low-frequency sound waves within the unit cell assembly by converting the low-frequency sound waves to heat by vibration.

Figure 5:
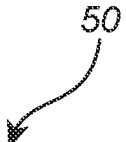
FIG. 5 is a flowchart of one illustrative embodiment of the method for forming the structural panel of the present disclosure.

FIG. 5 is a flowchart of one illustrative embodiment of the method 50 for forming the structural panel assembly 30 of the present disclosure. The method includes the steps of: disposing the unit cell assembly one or more of horizontally and vertically adjacent to a plurality of other unit cell assemblies to form an array of unit cell assemblies forming the structural panel assembly (step 52) and, optionally, disposing the structural panel assembly between the inner panel and the outer panel of the vehicle or other structure (step 54).

Thus, the design of the present disclosure houses a phononic crystal disc or the like, which acts as a scatterer for SPC functionality and a vibrating mass for LRPC functionality. The phononic crystal is connected to an outer frame using LRPC springs, which have different spring stiffness that may be tuned. The stiffness of the LRPC springs may be altered to change the resonance mode shape to target specific frequencies. The vibrator mass may be altered for the same purpose by changing the infill density, for example. The outer frame and inner frame of the design are separated and kept in place by load springs having the same stiffness, which act as QZS structures during an impact.

This design also uses the inherent shape memory behavior of common polymeric materials, like PLA and TPU, in order to regain an original shape post impact with heat as the stimuli. Using such materials, along with meta-structures/architected materials, provides a lightweight and compact solution as compared to conventional methods. The potential applications for this innovation are diverse, ranging from the automotive and aerospace industries, where impact resistance and noise control are crucial, to the construction industry.

Thus, the proposed solution integrates the QZS structures, SPC, and LRPCs into a single unit cell that can be programmed for each application given the loads and frequency isolation data. It offers the advantage of enhanced impact sustainability. Unlike conventional approaches, that primarily rely on the strength and stiffness of the materials used, QZS structures exhibit extremely low stiffness under normal conditions and efficiently absorb and dissipate impact energy, minimizing transmitted forces and reducing the risk of structural damage. The proposed solution also offers the advantage of targeted noise attenuation. The integration of phononic crystals within the unit cell enables precise control and manipulation of sound waves. Unlike conventional noise reduction methods that often provide general noise attenuation, the phononic crystals selectively attenuate or block specific frequency ranges associated with noise. The proposed solution further offers the advantage of versatility and integration. The unit cell offers versatility in its applications and integration into existing structures. It can be seamlessly incorporated into various components, such as vehicle frames and body panels, door panels, machinery mounts, etc.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A unit cell assembly, comprising:
an outer frame member spaced apart from an inner frame member;
a plurality of quasi-zero stiffness (QZS) spring members disposed between the inner frame member and the outer frame member;
a phononic crystal disposed between the inner frame member and the outer frame member; and
a plurality of locally-resonating phononic crystal (LRPC) spring members disposed between the phononic crystal and one or more of the inner frame member and the outer frame member.

2. The unit cell assembly of claim 1, wherein the outer frame member is an open frame member allowing for the penetration of sound waves into the unit cell assembly through the outer frame member.

3. The unit cell assembly of claim 1, wherein the inner frame member is a closed frame member comprising a barrier material attenuating the transmission of sound waves out of the unit cell assembly through the inner frame member.

4. The unit cell assembly of claim 1, wherein the phononic crystal is a disc that acts as a scattering phononic crystal (SPC) for attenuating high-frequency sound waves within the unit cell assembly.

5. The unit cell assembly of claim 1, wherein the phononic crystal is a disc that acts as a vibrating mass for the LRPC spring members for attenuating low-frequency sound waves within the unit cell assembly by converting the low-frequency sound waves to heat by vibration.

6. The unit cell assembly of claim 1, wherein:
the plurality of QZS spring members are disposed at vertices of the inner frame member and the outer frame member;
the plurality of LRPC spring members are disposed between the plurality of QZS spring members; and
the plurality of LRPC spring members are disposed between the phononic crystal and the outer frame member.

7. The unit cell assembly of claim 1, wherein the plurality of LRPC spring members are each disposed at an oblique angle between the phononic crystal and the one or more of the inner frame member and the outer frame member.

8. The unit cell assembly of claim 1, wherein the unit cell assembly is formed by one or more of an additive manufacturing technique and a molding technique.

9. A structural panel assembly, comprising:
an array of unit cell assemblies, wherein each unit cell assembly comprises:
an outer frame member spaced apart from an inner frame member;
a plurality of quasi-zero stiffness (QZS) spring members disposed between the inner frame member and the outer frame member;

a phononic crystal disposed between the inner frame member and the outer frame member; and
a plurality of locally-resonating phononic crystal (LRPC) spring members disposed between the phononic crystal and one or more of the inner frame member and the outer frame member.

10. The structural panel assembly of claim 9, wherein the outer frame member is an open frame member allowing for the penetration of sound waves into the unit cell assembly through the outer frame member.

11. The structural panel assembly of claim 9, wherein the inner frame member is a closed frame member comprising a barrier material attenuating the transmission of sound waves out of the unit cell assembly through the inner frame member.

12. The structural panel assembly of claim 9, wherein the phononic crystal is a disc that acts as a scattering phononic crystal (SPC) for attenuating high-frequency sound waves within the unit cell assembly.

13. The structural panel assembly of claim 9, wherein the phononic crystal is a disc that acts as a vibrating mass for the LRPC spring members for attenuating low-frequency sound waves within the unit cell assembly by converting the low-frequency sound waves to heat by vibration.

14. The structural panel assembly of claim 9, wherein the plurality of LRPC spring members are each disposed at an oblique angle between the phononic crystal and the one or more of the inner frame member and the outer frame member.

15. The structural panel assembly of claim 9, wherein the array of unit cell assemblies is one or both of an array of horizontally disposed unit cell assemblies and an array of vertically disposed unit cell assemblies, and wherein the array of unit cell assemblies is formed by one or more of an additive manufacturing technique and a molding technique.

16. The structural panel assembly of claim 9, wherein the array of unit cell assemblies is disposed between an inner panel and an outer panel of a vehicle structure.

17. A method for forming a unit cell assembly, the method comprising the steps of:
providing an outer frame member spaced apart from an inner frame member;
providing a plurality of quasi-zero stiffness (QZS) spring members disposed between the inner frame member and the outer frame member;
providing a phononic crystal disposed between the inner frame member and the outer frame member; and
providing a plurality of locally-resonating phononic crystal (LRPC) spring members disposed between the phononic crystal and one or more of the inner frame member and the outer frame member;
wherein the providing steps comprise using one or more of an additive manufacturing technique and a molding technique.

18. The method of claim 17, wherein the outer frame member is an open frame member allowing for the penetration of sound waves into the unit cell assembly through the outer frame member, and wherein the inner frame member is a closed frame member comprising a barrier material attenuating the transmission of sound waves out of the unit cell assembly through the inner frame member.

19. The method of claim 17, wherein the phononic crystal is a disc that acts as a scattering phononic crystal (SPC) for attenuating high-frequency sound waves within the unit cell assembly and as a vibrating mass for the LRPC spring members for attenuating low-frequency sound waves within the unit cell assembly by converting the low-frequency sound waves to heat by vibration.

20. The method of claim 17, further comprising disposing the unit cell assembly one or more of horizontally and vertically adjacent to a plurality of other unit cell assemblies to form an array of unit cell assemblies forming a structural panel assembly.

\* \* \* \* \*